(12) United States Patent
Hoppe

(10) Patent No.: US 12,726,072 B2
(45) Date of Patent: Sep. 1, 2026

(54) COOLING SPRAY TUBE ARRANGEMENT ABOVE STATOR OF ELECTRICAL MACHINE

(71) Applicant: ZF Friedrichshafen AG, Friedrichshafen (DE)

(72) Inventor: Ronny Hoppe, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 156 days.

(21) Appl. No.: 18/573,024

(22) PCT Filed: May 13, 2022

(86) PCT No.: PCT/EP2022/063041
§ 371 (c)(1),
(2) Date: Dec. 21, 2023

(87) PCT Pub. No.: WO2022/268406
PCT Pub. Date: Dec. 29, 2022

(65) Prior Publication Data

US 2024/0291337 A1 Aug. 29, 2024

(30) Foreign Application Priority Data

Jun. 22, 2021 (DE) ..................... 10 2021 206 366.7

(51) Int. Cl.
*H02K 5/15* (2006.01)
*H02K 5/20* (2006.01)
(Continued)

(52) U.S. Cl.
CPC ................. *H02K 5/15* (2013.01); *H02K 5/20* (2013.01); *H02K 9/19* (2013.01); *H02K 9/197* (2013.01)

(58) Field of Classification Search
CPC ............ H02K 5/20; H02K 9/19; H02K 9/193; H02K 9/197; H02K 5/15
See application file for complete search history.

(56) References Cited

U.S. PATENT DOCUMENTS 10,746,287 B2 8/2020 Miyamoto et al.
10,770,949 B2 9/2020 Scharlach
(Continued)

FOREIGN PATENT DOCUMENTS

DE 10 2012 019 749 A1 4/2014
DE 102014224941 A1 * 6/2016 ............... H02K 9/19
(Continued)

OTHER PUBLICATIONS

Takeno (JP 2020061859 A) English Translation. (Year: 2020).*
(Continued)

*Primary Examiner* — Tulsidas C Patel
*Assistant Examiner* — Robert E Mates
(74) *Attorney, Agent, or Firm* — Secant IP, PLLC

(57) ABSTRACT

A cooling arrangement for an electric machine includes a machine housing and a stator mounted rotationally symmetrically in a radial direction around at least one rotor in the machine housing. The stator has a stator winding extending axially between opposite ends in which are located a first winding head and a second winding head. At least one spray tube configured to convey fluid is fixed radially above the stator and extends axially over the full length of the stator. The spray tube is connected to a supply duct for delivery of fluid, where the spray tube has at least two outlet openings that include an outlet opening in an area above the first winding head and in an area above the second winding head, so that the coolant flowing through can flow down at least in part onto the first winding head and the second winding head.

11 Claims, 3 Drawing Sheets

(51) Int. Cl.
*H02K 9/19* (2006.01)
*H02K 9/197* (2006.01)

(56) References Cited

U.S. PATENT DOCUMENTS

2002/0125788 A1 9/2002 Leijon et al.
2012/0091835 A1 4/2012 Kim et al.
2015/0280526 A1 10/2015 Chamberlin et al.
2019/0113135 A1* 4/2019 Miyamoto .............. F25B 45/00

FOREIGN PATENT DOCUMENTS

JP H09-23615 A 1/1997
JP 2020061859 A * 4/2020 ............. B60K 11/02

OTHER PUBLICATIONS

Kleindienst (DE 102014224941 A1) English Translation. (Year: 2016).*
German Patent Office, Search Report issued in German patent application No. 10 2021 206 366.7 (May 2, 2022).
European Patent Office, International Search Report issued in International application No. PCT/EP2022/060341 (Sep. 23, 2022).
European Patent Office, Written Opinion issued in International application No. PCT/EP2022/060341 (Sep. 23, 2022).

* cited by examiner

COOLING SPRAY TUBE ARRANGEMENT ABOVE STATOR OF ELECTRICAL MACHINE

RELATED APPLICATIONS

This application claims the benefit under 35 U.S.C. § 371 as a U.S. National Phase Application of application no. PCT/EP2022/063041, filed on 13 May 2022, which claims the benefit of German Patent Application no. 10 2021 206 366.7 filed on 22 Jun. 2021, the contents of which are hereby incorporated herein by reference in their entireties.

FIELD OF THE DISCLOSURE

The invention relates to a cooling arrangement comprising a machine housing and a stator, which is mounted rotationally symmetrically in the radial direction around at least one rotor in the machine housing, wherein the stator has a stator winding such that the stator winding extends in an axial direction between opposite ends having, respectively, a first winding head and a second winding head.

Furthermore, the invention relates to an electric machine with a cooling arrangement of that type.

BACKGROUND

The efficiency of an electric machine depends on the losses in the machine.

Losses occur, for example, as Joule losses and are given out in the form of heat. The losses result in high temperatures in the windings and particularly in the winding heads surrounded by air.

It is therefore desirable to dissipate this heat from the electric machines in order to increase the useful life, the security against failure, and the performance capacity of the electric machines. In particular, in stators and in the densely coiled winding heads, overheating can destroy the insulation system associated with the windings of an electric machine, and this can reduce the power and efficiency of the electric machine.

Accordingly, the temperature of the stator windings has to be kept low in order to avoid shortening the useful life and to ensure problem-free operation. An efficient cooling system is therefore very important.

From the prior art it is known to cool the winding heads with air. It is also known to cool electric machines with a fluid.

DE 11 2015 001 505 T5 discloses a fluid-cooled electric machine with a core which defines a first axial end, a second axial end, and a plurality of slits that extend between the first axial end and the second axial end; on the core there are coiled windings disposed in the areas of the slits, which are arranged in the plurality of slits and which have change-of-direction (turn) sections located at the first axial end and at the second axial end; a cooling tube, which is connected to the turn sections of the windings; and a heat transfer element that extends between the cooling tube and the windings and is in contact with the cooling tube and the windings.

DE 10 2012 019 749 A1 discloses an electric machine for a motor vehicle drivetrain, which comprises a housing, a rotor, a stator with two winding heads, and a cooling heat exchanger, wherein the two winding heads are cooled directly by an electrically insulating coolant fluid.

SUMMARY

A purpose of the present invention is to provide an efficient and optimized cooling arrangement for an electric machine, which in particular brings about effective cooling of the winding heads. A further task is to indicate an electric machine with such a cooling arrangement.

This objective is achieved by a cooling arrangement comprising a machine housing and a stator which is mounted rotationally symmetrically in the radial direction around at least one rotor in the machine housing, wherein the stator comprises a stator winding, such that the stator winding extends in an axial direction between opposite ends at which a first winding head and a second winding head are arranged, wherein in the radial direction above the stator at least one spray tube fixed to the stator is arranged, which spray tube extends in the axial direction over the full length of the stator and which is designed to convey a fluid, wherein a supply duct is provided and wherein the at least one spray tube is connected to the supply duct for delivering the fluid, and wherein the at least one spray tube has at least two outlet openings such that, respectively, one outlet opening is arranged in the area above the first winding head and one outlet opening is arranged in the area above the second winding head, so that a cooling fluid flowing through flows down at least in part onto the first winding head and onto the second winding head.

Alternatively, further spray tubes can additionally be arranged around the stator, which can be made analogously to the at least one spray tube positioned above the stator.

In this case an axial direction extends along a rotation axis. A radial direction extends essentially perpendicular to the rotation direction.

The outlet openings can preferably be in the form of circular holes.

The spray tube preferably has a circular cross-section, but it can also have a rectangular cross-section or some other cross-section.

According to the invention, the cooling fluid (coolant) passes through the spray tube to the stator and to the windings, or directly onto the latter.

By virtue of the cooling arrangement according to the invention a serious problem can be solved, namely that of directing enough coolant onto the stator to cool it, and particularly onto the winding heads.

By means of the spray tube according to the invention sufficient fluid, preferably oil, can now flow selectively onto the winding heads so that highly efficient cooling of the stator as a whole can be achieved without having to sacrifice a compact structure.

Preferably, the coolant flows into the spray tube under pressure.

A further design feature is that the at least one spray tube is arranged, against the direction of the force of gravity, radially above the stator, so that the coolant flowing through flows at least partially down onto the first winding head and the second winding head by the action of gravity. Thanks to this arrangement, by arranging the at least one spray tube in a 12 o'clock position above the fixed stator, coolant can be directed onto the winding heads even without much fluid pressure, and this makes for simple realization. Moreover, this arrangement enables a targeted wetting of the winding heads with coolant.

Another design feature is that the machine housing comprises a centering plate which encloses the stator radially at a first axial end and which also extends radially a distance above the stator and axially in a centering plate section, and wherein the machine housing further comprises a bearing shield which encloses the stator radially at a second axial end, and which also extends in part, radially a distance above the stator and axially as far as the centering plate in a bearing shield section, so that by virtue of the bearing shield section and the centering plate section a hollow space located a distance away from the stator in the radial direction is formed, and wherein the at least one spray tube is arranged in the hollow space and is fixed axially and radially by the bearing shield and the centering plate.

In that way, a simple arrangement of the spray tube which does not take up any more space is enabled. The bearing shield section and the centering plate section are directly in contact or are arranged in contact with one another and are positioned relatively to one another in such manner that little axial or radial displacement is possible.

The bearing shield and the centering plate enable the spray tube to be fixed axially and also radially in a simple manner.

Preferably, the fixing is designed as a clamp.

In that case, the spray tube is clamped between the bearing shield and the centering plate. This enables the radial and axial fixing to be released in a simple manner.

In a further embodiment, the centering plate has an integrated sleeve through which fluid can flow, which is attached in alignment with the at least one spray tube in the axial direction in the centering plate so that coolant can flow through the sleeve in the axial direction into the at least one spray tube. Here, the sleeve can also be a hollow cylinder or a tube. The central axis of the spray tube, as it were, forms an extension of the central axis of the sleeve.

Thus, the coolant can flow simply from the sleeve into the spray tube. The sleeve is attached in such manner that fluid flows axially in the axial direction from the sleeve into the spray tube.

Furthermore, in another design feature the centering plate has a cut-out which is positioned in axial alignment with the integrated sleeve, and wherein the supply duct designed to convey the fluid is integrated in the centering plate so that it opens radially into the cut-out, whereby the coolant can flow in through the supply duct into the cut-out and through it into the sleeve.

Thus, the coolant supply is brought into the centering plate, for example by way of a bore. In that way the coolant can be fed into the spray tube simply, by means of pressure. The sleeve is positioned directly in front of the bore so that the coolant can flow in unimpeded.

A further design feature is that at its connection point the sleeve is brazed or welded to the at least one spray tube. This creates a material-merged permanent and leakproof connection.

In a further design, on its outer envelope surface the sleeve has an all-round groove, and a seal is provided which is fitted into the all-round groove to seal the connection.

Preferably the seal is an O-ring. This seals the sleeve in the centering plate in relation to the coolant.

In a further design feature a total of four outlet openings are provided, in each case with two of the outlet openings radially in the area above one of the winding heads, and the respective two outlet openings made on a circumferential circle line in the at least one spray tube so that the coolant flowing through the two outlet openings positioned on the circumferential line in each case can flow at least partially onto one of the respective winding heads. This enables effective cooling of the winding heads. The outlet openings can be made circular or, for example, oval-shaped.

In this way the winding heads are sprayed uniformly from above. Moreover, in that way more fluid, such as oil, can be directed onto the winding heads and uniform cooling can be achieved.

In a further design an additional two outlet openings are arranged in the axial direction between the aforesaid four outlet openings. Thereby, the stator is cooled along its full axial length. Thanks to the six outlet openings uniform cooling is achieved with little consumption of the coolant, for example oil consumption. Also preferably, the outlet openings have a radius in the region of 0.5 to 1 mm. In that way the outlet openings behave as nozzles and can direct the coolant onto the winding heads in a targeted manner.

The outlet openings can be made as bores. This allows the outlet openings to be made simply.

BRIEF DESCRIPTION OF THE DRAWINGS

The objective is also achieved with an electric machine having a rotor and a stator surrounding the rotor, with a cooling arrangement as described above. The stator has a stator winding with axial winding heads. The rotor is in particular mounted, rotatably relative to the stator, on a shaft. Such an electric machine is for example suitable for use in motor vehicles. Further features, properties and advantages of the present invention emerge from the following description, with reference to the attached figures which show, schematically.

DETAILED DESCRIPTION

Figure 1:
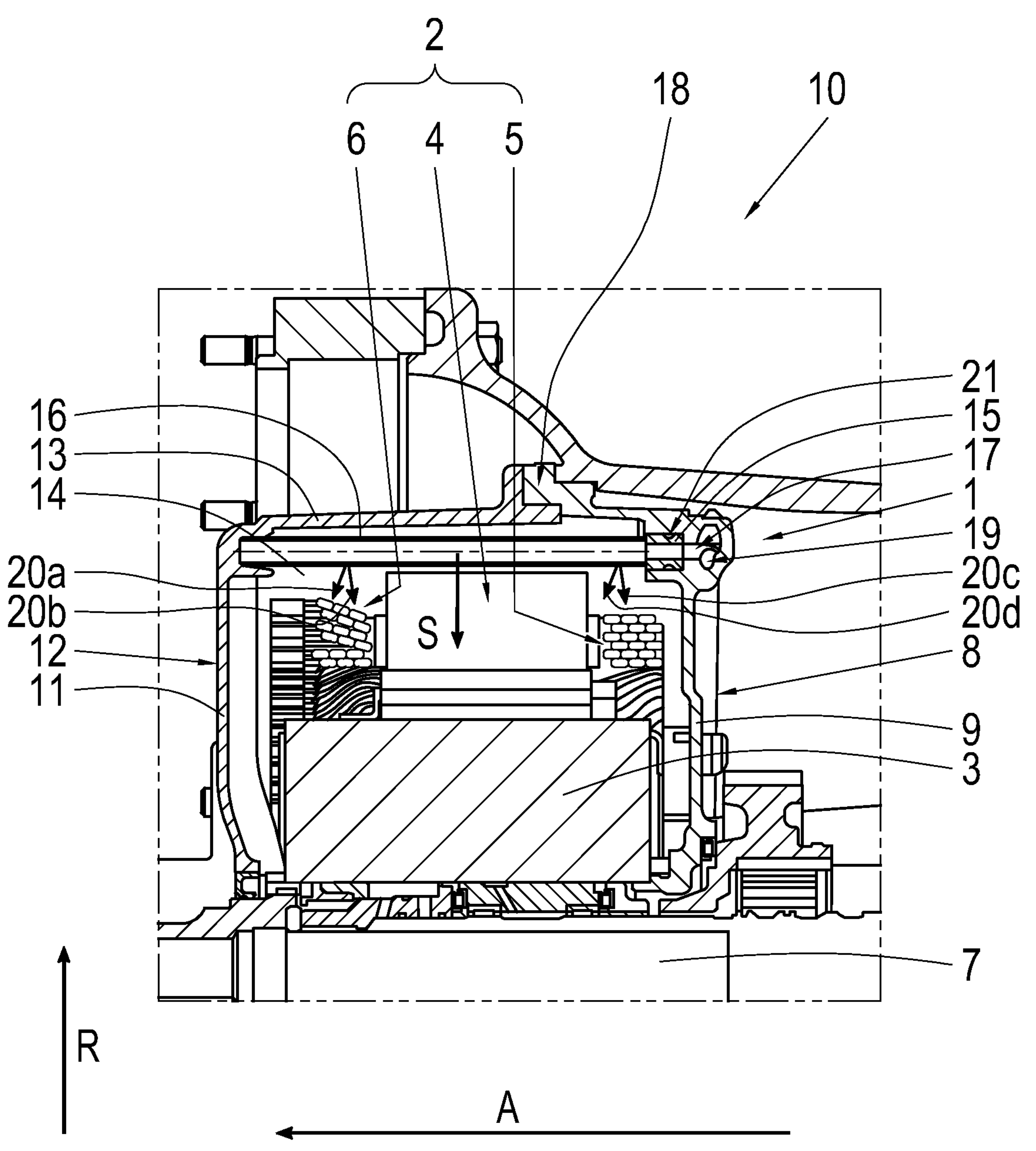
FIG. 1: A cooling arrangement according to the invention in a first embodiment.

FIG. 1 shows an electric machine 10 with a cooling arrangement 1 in use. The electric machine 10 comprises a stator 2 and a rotor 3. The electric machine 10 can be operated as a motor and as a generator.

Furthermore, the electric machine 10 can be designed to drive a motor vehicle.

The rotor 3 is mounted to rotate about a shaft 7, which shaft 7 defines the axial direction A. Perpendicular to the axial direction A is a radial direction R.

The stator 2 is arranged fixed, with an air gap above the rotor 3 in the radial direction R.

Moreover, the stator 2 comprises a stator core 4 and a winding, which extends axially between a first winding head 5 and a second winding head 6.

During operation heat is generated in the stator core 4 and in the winding, and also in the winding heads 5, 6, which heat must be dissipated as effectively as possible.

In addition, a housing is provided, which comprises a centering plate 9 that encloses the stator 2 in the radial direction R at a first axial end 8. Furthermore, the centering plate 9 has an extension in the axial direction A, which in the radial direction R is in the form of a centering plate section 18 a distance above the stator 2.

In addition, the housing comprises a bearing shield 11 which encloses the stator 2 in the radial direction R at a second axial end 12. Moreover, the bearing shield 11 has an extension in the axial direction A, which in the radial direction R is in the form of a bearing shield section 13 a distance above the stator 2.

A hollow space 14 a distance away from the stator 2 in the radial direction R is formed by the bearing shield section 13 and the centering plate section 18. The electric machine 10 also has a spray tube 16, which is arranged in the axial direction A inside the hollow space 14.

In its radial section the centering plate 9 has an integrated sleeve 15 designed to convey fluid, which is attached in axial alignment with the spray tube 16 in the axial direction A in the centering plate 9, so that the coolant flows through the sleeve 15 in the axial direction A into the spray tube 16. In this context the sleeve 15 can also be a hollow cylinder or a bore.

Here, "aligned" means that fluid can flow directly between the sleeve 15 and the spray tube 16. Thus, in such case, the central axis of the spray tube 16 forms an extension of the central axis of the sleeve 15.

Furthermore, at its connection point the sleeve 15 is brazed or welded to the spray tube 16. This creates a material-merged, permanent and leakproof connection.

In addition, the centering plate 9 or the radial portion of the centering plate 9 has a cut-out 17 which is arranged in axial alignment with the integrated sleeve 15. Thus, the cut-out 17 is directly in front of the sleeve 15, so that coolant can flow into the sleeve 15 unimpeded.

The cut-out 17 forms the end of a supply duct 19 designed to convey the fluid, which is integrated in the centering plate 9. Fluid can therefore flow through the supply duct 19 into the cut-out 17, from there into the sleeve 15 and then into the spray tube 16.

The supply duct 19 can for example be in the form of a bore. In that way the coolant can simply pass under pressure into the spray tube 16. Preferably, the pressure is on the order of 10 bar/l.

Furthermore, on its outer envelope surface the sleeve 15 has an all-round groove in which an O-ring 21 is fitted as a seal, in order to prevent any overflow of fluid by way of the outer envelope of the sleeve 15.

Alternatively, instead of the sleeve 15 an axially integrated bore can be provided.

Fluid can now be fed into the spray tube 16 through the supply duct 19, the cut-out 17 and the sleeve 15.

In this case the spray tube 16 is radially fixed in the area above the stator 2, for example fixed (non-rotating) relative to the stator. Here, "radially above" means in particular that the spray tube 16 is arranged in the direction opposite to gravity S above the stator 2 in the hollow space 14.

In the spray tube 16, to allow the fluid to emerge, four outlet openings (here represented by arrows 20*a*, 20*b*, 20*c*, 20*d*) are provided, respectively with two outlet openings 20*a*, 20*b* positioned in the radial direction R in the area above the first winding head 5 and with two outlet openings 20*c*, 20*d* positioned in the radial direction R in the area above the second winding head 6.

The two outlet openings 20*a*, 20*b* are in this case arranged on a circumferential surface line and the two outlet openings 20*c*, 20*d* are also arranged on a circumferential surface line positioned in the spray tube 16 in such manner that coolant flowing through the outlet openings 20*a*, 20*b*, 20*c*, 20*d* runs down over the two winding heads 5, 6 under the effect of gravity acting on the coolant and by virtue of the pressure of the coolant.

In that way the coolant flows onto and wets the two winding heads 5, 6 and cools them.

In particular, the outlet openings 20*a*, 20*b*, 20*c*, 20*d* are each in the form of bores.

By virtue of the outlet openings 20*a*, 20*b*. 20*c*, 20*d* made and positioned respectively above the winding heads 5, 6 the winding heads can be cooled in a targeted manner.

Figure 2:
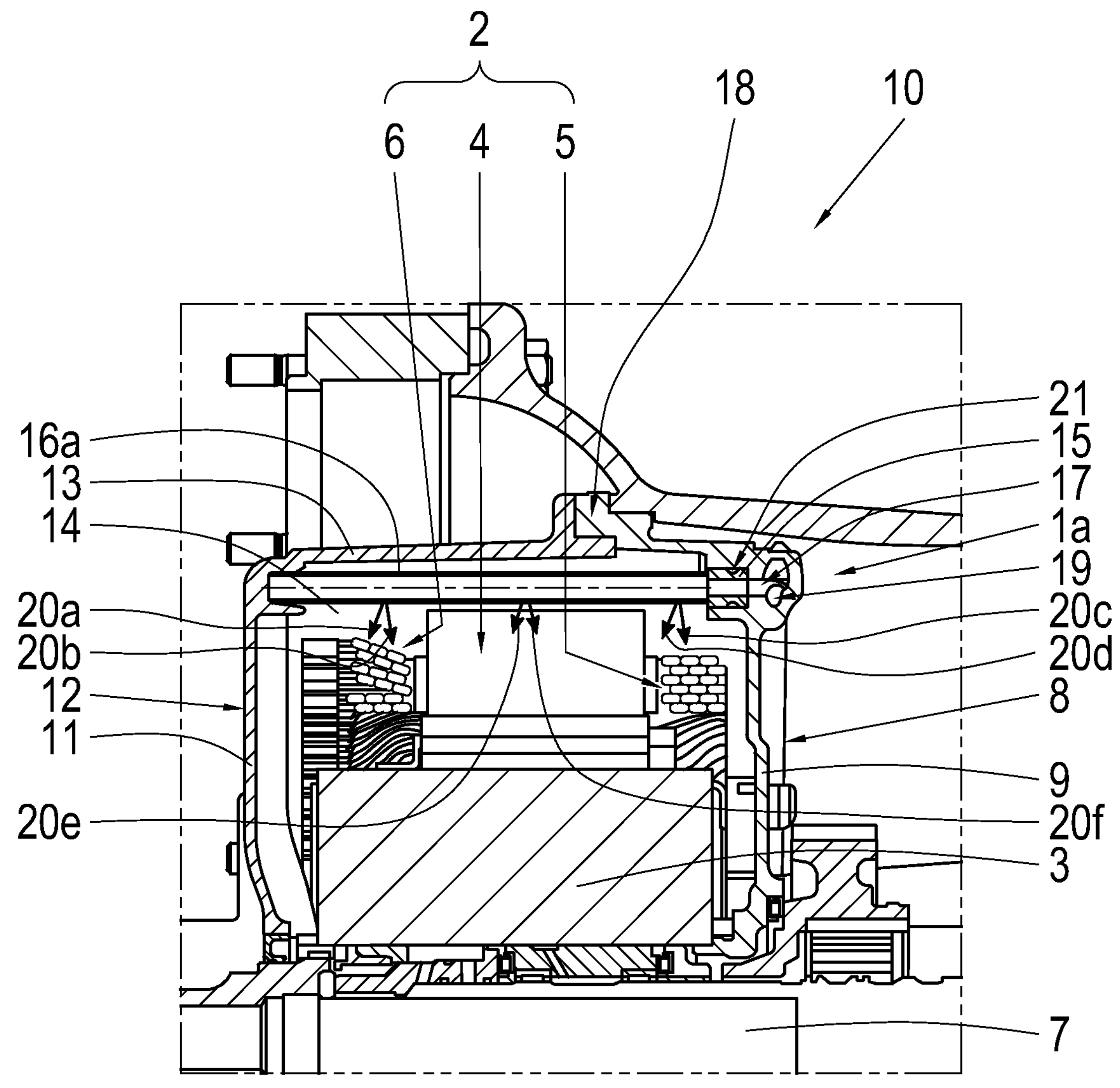
FIG. 2: A cooling arrangement according to the invention in a second embodiment.

FIG. 2 shows an electric machine 10 with another cooling arrangement 1*a* in use.

The electric machine 2 likewise has a stator 2 and a rotor 3. Moreover, the stator 2 comprises the stator core 4, the first winding head 5 and the second winding head 6.

Furthermore, the housing is provided, comprising the centering plate 9 which encloses the stator 2 in the radial direction R at its first axial end 8. In addition, the centering plate 9 again has the extension in the axial direction A which forms a centering plate section 18.

In addition, the electric machine 10 comprises the bearing shield 11 and the bearing shield section 13.

The electric machine 10 again has a spray tube 16*a* arranged above the stator 2. Again, analogous to FIG. 1, fluid can be fed by way of the supply duct 19, the cut-out 17 and the sleeve 15 into the spray tube 16*a*.

Furthermore, the sleeve 15 again has an O-ring 21 analogous to FIG. 1. Alternatively, instead of the sleeve 15 an axially integrated bore can be provided.

By way of the supply duct 19, the cut-out 17 and the sleeve 15, fluid can now be fed into the spray tube 16*a*.

In this case, the spray tube 16*a* is arranged fixed, for example fixed (non-rotating) relative to the stator, in the area above the stator 2.

In the spray tube 16*a*, to allow the fluid to emerge six outlet openings (here denoted by arrows 20*a*, 20*b*, 20*c*, 20*d*, 20*e*, 20*f*) are provided, respectively with the two outlet openings 20*a*, 20*b* positioned in the radial direction R in the area above the first winding head 5 as in FIG. 1, and with the two outlet openings 20*c*, 20*d* positioned in the radial direction R in the area above the second winding head 6 as in FIG. 1.

In addition, centrally in the axial direction A two further outlet openings 20*e* and 20*f* are provided, which are made on a circumferential circle line in the spray tube 16*a*. These are arranged between the outlet openings 20*a*, 20*b* and the outlet openings 20*c*, 20*d*.

In that way fluid can also flow onto the middle of the stator 2. With this arrangement the stator 2 can be cooled along its entire length with enough fluid to cool it. Moreover, a uniform distribution of the fluid can be achieved so that the cooling is uniform.

Figure 3:
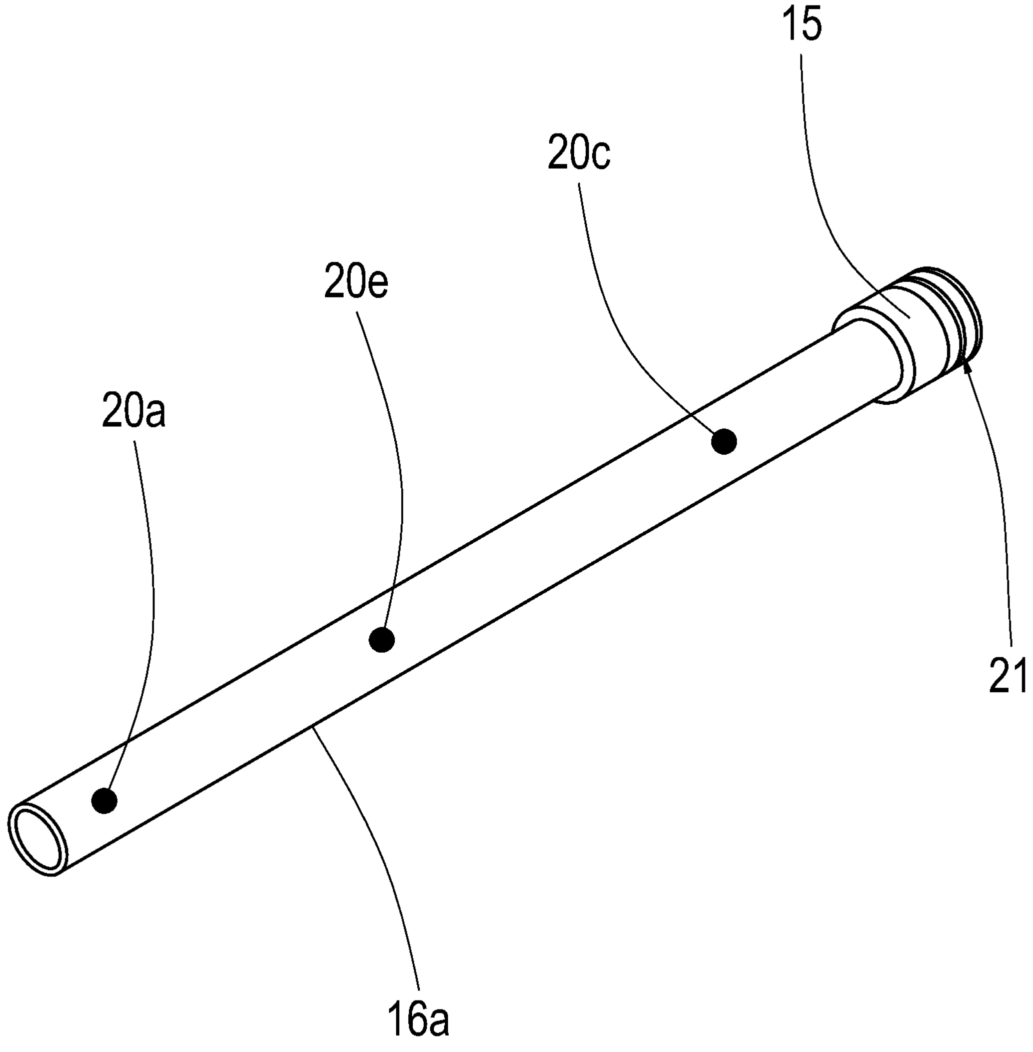
FIG. 3: A spray tube according to the invention, shown in detail.

FIG. 3 shows a spray tube 16*a* with the sleeve 15 in detail. This has the six outlet openings 20*a*, 20*b*, 20*c*, 20*d*, 20*e*, 20*f* (FIG. 2), of which three outlet openings 20*a*, 20*c*, 20*e* are shown here in detail.

By means of a spray tube 16*a* arranged in this way a lot of fluid, uniformly distributed, can be directed along the full length of the stator 2 to cool it.

The outlet openings 20*a*, 20*b*, 20*c*, 20*d*, 20*e*, 20*f* (FIG. 2) can each be in the form of bores with a diameter of 0.5 to 11 mm.

Furthermore, two such spray tubes can be arranged around the stator 2 if more fluid is required.

INDEXES

1, 1*a* Cooling arrangement
2 Stator
3 Rotor
4 Stator core
5 First winding head
6 Second winding head
7 Shaft

8 First axial end
9 Centering plate
10 Electric machine
11 Bearing shield
12 Second axial end
13 Bearing shield section
14 Hollow space
15 Sleeve
16, 16*a* Spray tube
17 Cut-out
18 Centering plate section
19 Supply duct
20*a*-20*f* Outlet openings
R Radial direction
A Axial direction
S Direction of the force of gravity

The invention claimed is:

1. A cooling arrangement comprising:

a machine housing;

a stator mounted in the machine housing rotationally symmetrically in a radial direction R around at least one rotor, wherein the stator comprises a stator winding, such that the stator winding extends in an axial direction between opposite ends;

a first winding head and a second winding head are arranged in the opposite ends of the stator winding;

a centering plate which encloses the stator radially at a first axial end and which also extends axially, radially a distance above the stator, forming a centering plate section;

at least one spray tube positioned in the radial position above the stator and fixed to the stator, wherein the at least one spray tube extends in an axial direction over a full length of the stator and is configured to convey a fluid;

an integrated sleeve designed to convey fluid, the integrated sleeve attached to the centering plate and aligned in the axial direction with the at least one spray tube, so that coolant can flow into the at least one spray tube in the axial direction from the sleeve; and a supply duct wherein the at least one spray tube is connected to the supply duct and configured for conveying the fluid;

wherein the at least one spray tube defines at least two outlet openings, the at least two outlet openings including a first outlet opening positioned in an area above the first winding head and a second outlet opening positioned in an area above the second winding head, so that a coolant flowing through the at least one spray tube flows at least in part down onto the first winding head and the second winding head.

2. The cooling arrangement according to claim 1, wherein the at least one spray tube is arranged in a direction opposite to the gravitational direction radially above the stator, so that the coolant flowing through flows at least in part due to the force of gravity acting upon the coolant, down onto the first winding head and the second winding head.

3. The cooling arrangement according to claim 1, wherein the machine housing further comprises a bearing shield which encloses the stator radially at a second axial end and which also extends, in part radially a distance above the stator, axially as far as the centering plate, forming a bearing shield section, so that a hollow space is formed by the bearing shield section and the centering plate section a distance away from the stator in the radial direction, and wherein the at least one spray tube is arranged in the hollow space and is fixed axially and radially by the bearing shield and the centering plate.

4. The cooling arrangement according to claim 3, wherein the fixing is by means of clamping.

5. The cooling arrangement according to claim 1, wherein the centering plate has a cut-out which is arranged in axial alignment with the integrated sleeve, and the supply duct is integrated in the centering plate so that the supply duct opens radially into the cut-out, whereby coolant can flow through the supply duct into the cut-out and from there into the integrated sleeve.

6. The cooling arrangement according to claim 5, wherein at a point of connection the integrated sleeve is brazed or welded to the at least one spray tube.

7. The cooling arrangement according to claim 1, wherein in its outer envelope surface the sleeve has an all-round groove, and includes a seal fitted into the all-round groove to form a seal.

8. The cooling arrangement according to claim 1, wherein the at least two outlet openings includes four outlet openings with two of the four outlet openings arranged in the radial direction in the area above one of the winding heads and an other two of the four outlet openings are made on a circumferential circle line in the at least one spray tube, so that the coolant flowing through the other two outlet openings arranged on the circumferential circle line flows at least in part, respectively, down onto one of the winding heads.

9. The cooling arrangement according to claim 8, wherein the at least two out outlet openings includes two further outlet openings arranged, respectively between the four outlet openings, in the axial direction.

10. The cooling arrangement according to claim 1, wherein the at least one spray tube includes further spray tubes distributed around a periphery of the stator.

11. An electric machine with a rotor and a stator surrounding the rotor, and a cooling arrangement according to claim 1.

* * * * *